United States Patent Office 3,068,295
Patented Dec. 11, 1962

3,068,295
Q-275-1 AND 4 DIETHER GROUPS
Karl A. Folkers, Plainfield, Carl H. Hoffman, Scotch Plains, and Donald E. Wolf, Princeton, N.J., assignors to Merck & Co., Inc., Rahway, N.J., a corporation of New Jersey
No Drawing. Filed Sept. 3, 1958, Ser. No. 758,657
7 Claims. (Cl. 260—613)

This invention relates to 2,3-dimethoxy-5-methylbenzoquinones, in particular to certain O-alkyl derivatives of the benzohydroquinones which are also substituted in the 6-position with an alkenyl radical varying in length from 1 to 10 isoprenoid units ($C_5$ to $C_{50}$ in length). The invention also involves the methods of producing the same.

The compounds of the invention may be represented by the structure:

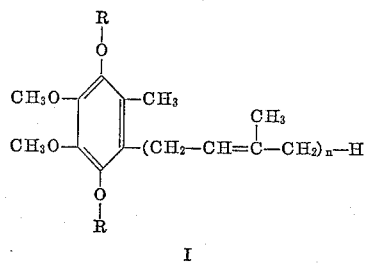

I in which R is lower alkyl having from one to six carbon atoms, and $n$ is an integer from one to ten.

A parent quinone of this type has been found to occur in normal tissue; in particular, one of the general structure II, where $n=10$, has been isolated from beef heart muscle (mitochondria):

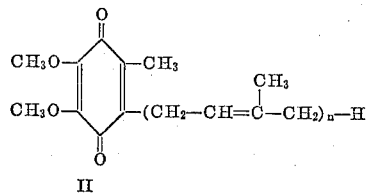

II by F. L. Crane, Y. Hatefi, R. L. Lester, and C. Widmer [Biochim. Biophys. Acta, 25, 220 (1957)]. This compound is known as Q-275 or as Coenzyme Q-10. Other variants have been isolated wherein $n=5$ to 9 inclusive and they are known as Q-5 to Q-9, respectively. This entire group of compounds is referred to as "Coenzyme Q's."

To prepare to carry out our invention, the selected benzoquinone, in which $n$ is 5 to 10, and which may be isolated from a living source, must first be reduced to the corresponding hydroquinone by a conventional reductive step which may be carried out by one of a number of means, specifically, sodium hydrosulfite, zinc and acid, catalytic hydrogenation, one of the metal hydrides, or sulfur dioxide, all of which are the usual means in the art for producing hydroquinones from quinones. This is indicated by the reaction:

(Step A)

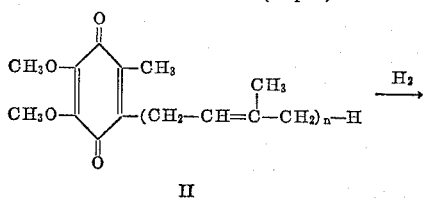

II

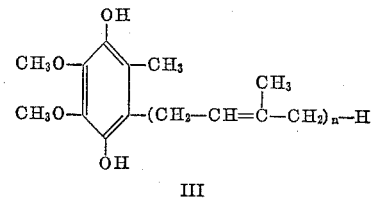

III in which $n$ is an integer from 5 to 10, the formulae representing Coenzyme Q-5 to Q-10 respectively which may be prepared from living sources.

The hydroquinones, useful as starting materials for producing the compound I of this invention, may as well be produced by synthetic means. The production of these compounds, having the structure III in which $n$ is an integer from 1 to 10 is described and claimed in a patent application S.N. 758,648 filed on August 25, 1958, in the name of C. H. Shunk et al. and entitled 2,3-dimethoxy benzoquinones (with 1 to 10 unsaturated side chain groups). The disclosure of that application is intended to be incorporated into the present application, by reference. That application specifically discloses the production of:

2,3-dimethoxy-5-methyl-6-(3'-methyl-2'-butenyl) - hydroquinone.
2,3-dimethoxy-5-methyl-6-geranylhydroquinone.
2,3-dimethoxy-5-methyl-6-farnesylhydroquinone.
2,3-dimethoxy-5-methyl-6-(3',7',11',15',-tetramethyl - 2',6',10',14'-hexadecatetraenyl)-hydroquinone.
2,3 - dimethoxy - 5 - methyl - 6-(3',7',11',15',19',-pentamethyl-2',6',10',14',18'-eicosapentaenyl)-hydroquinone.
2,3 - dimethoxy - 5-methyl-6-(3',7',11',15',19',23',27',31'-octamethyl - 2',6',10',14',18',22',26',30',-dotriacontaoctaenyl)-hydroquinone (I, $n=8$).

The hydroquinone, whether it is obtained by preparation from a natural source or is obtained by the procedure of the above mentioned application, is then alkylated by the following step of our invention:

(Step B)

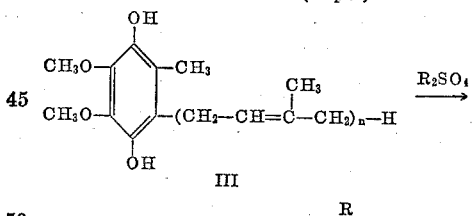

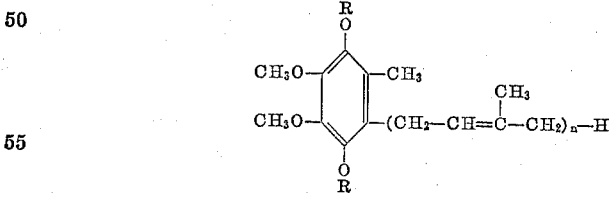

I (where R is alkyl having from 1 to 6 carbon atoms and $n$ is an integer from 1 to 10).

The most readily available and useful agents are the dialkyl sulfates and alkali, although others, such as diazomethane, or other diazo alkanes may be used.

This step is carried out by treating the hydroquinone III in solution in ethanol, or as an oily suspension in alkaline water, and preferably but not necessarily under a protective atmosphere such as nitrogen gas, with excess dialkyl sulfate and excess alkali from any one of a number of strong bases of the alkali metals; the alkali being added gradually until the reaction is complete. Room temperature is the usual operating temperature, however larger amounts may require an initial reaction period at ice bath temperatures; also, final heating to reflux for a time is useful in completing the reaction rapidly, the entire reaction being completed in one-half to four hours.

The dialkyl compound I is then conveniently isolated by extraction, washing and evaporation of the extraction solvent to leave the desired product, a 1,4-dialkoxy-2,3-dimethoxy-5-methyl-6-alkenyl benzene, wherein the side chain substituted at the 6-position consists of one to ten isoprenoid units. A specific example is the dimethyl ether of the hydroquinone of Q-10, wherein $x=10$, the side chain at position 6 having ten isoprenoid units.

These compounds have ultraviolet absorbing properties and a high solubility in non-polar solvents and oils, thereby being particularly suited for compounding in certain lotions and emollients such as anti-sunburn preparations. The following examples are intended to be illustrative, but not restrictive, of our invention:

The following terminology is employed in naming the compounds produced by the examples. The compounds wherein the side chain at position 6 of the nucleus is composed of 2 or less isoprenoid units will be named by the usual system, viz.:

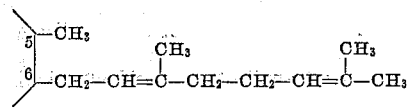

6-(3',7'-dimethyl-2',6'-octadienyl)-etc.

Because longer side chains result in unnecessarily lengthy names, it is preferable to use a system wherein Greek prefixes signifying the repeating radical and number thereof attached serially "head to tail," are employed, viz.:

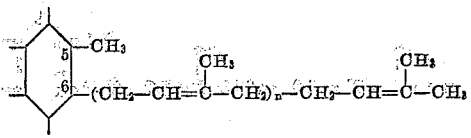

where $n=2$—6 - [3'-methyl-2'-butenyl-bis-(3'-methyl-2'-butenylene)]

where $n=3$—6 - [3'-methyl-2'-butenyl-tris-(3'-methyl-2'-butenylene)].

where $n=4$—6 - [3'-methyl-2'-methyl-2'-butenyl-tetrakis (3'-methyl-2'-butenylene)].

where $n=5$—6 - [3'-methyl-2'-butenyl-pentakis(3'-methyl-2'-butenylene)].

where $n=6$—6 - [3'-methyl-2'-butenyl-hexakis(3'-methyl-2'-butenylene)].

where $n=7$—6 - [3'-methyl - 2' - butenyl-heptakis-(3'-methyl-2'-butenylene)].

where $n=8$—6 - [3'-methyl-2'-butenyl-oktakis-(3'-methyl-2'-butenylene)].

where $n=9$—6 - [3'-methyl-2'-butenyl-enakis-(3'-methyl-2'-butenylene)].

EXAMPLE 1

*1,2,3,4 - Tetramethoxy-5-Methyl-6-[3'-Methyl-2'-Butenyl-Enakis-(3'-Methyl-2'-Butenylene)]-Benzene.*

*Reduction with sodium hydrosulfite (Step A).*—A solution of 3.0 g. of the yellow-orange quinone form of Coenzyme Q-10 dissolved in 25 ml. of ethanol and 25 ml. of ether was treated with a solution of 12 g. of sodium hydrosulfite in approximately 120 ml. of water by gradual addition with agitation. Another 25 ml. of both ether and ethanol were added during the reduction, which was carried out in an inert atmosphere provided by introduction of pieces of solid carbon dioxide, as was the following extraction and recovery.

The ether layer was increased to about 100 ml. The water layer was separated and then further extracted three times more with equal volumes of ether. The ether extracts were washed three times by saturated salt solution, dried over anhydrous magnesium sulfate, filtered and concentrated to an oily residue, which weighed 3.0 g. After pumping free of solvent, the hydroquinone crystallized. This hydroquinone of Coenzyme Q-10 was methylated as given in the next part.

*Methylation with dimethyl sulfate (Step B).*—A 2.0-g. portion of the hydroquinone of Coenzyme Q-10 prepared as above was evaporated from its ether solution to a residual oil under nitrogen in a 3-necked flask equipped with stirrer, gas inlet and reflux condenser and to which 0.1 g. of sodium hydrosulfite had been added. Purified nitrogen gas was supplied to the gas inlet. To the residual hydroquinone, 5 ml. of ethanol (2BA) and 5 ml. of redistilled dimethyl sulfate were added. With stirring, 6.5 ml. of 30% sodium hydroxide solution was added in small portions during approximately 1 hour. The mixture remained distinctly alkaline after addition was complete. The mixture was then heated to reflux and stirred one and one-half hours. The mixture was cooled, and after addition of approximately 50 ml. of water was extracted 3 times with 100 ml. portions of ether. The combined ether extracts were washed with saturated sodium chloride solution, dried over anhydrous magnesium sulfate, filtered, and the filtrate was concentrated to a residual oil. (The weight of an aliquot showed the total yield of crude dimethyl-dihydro-Q-10 to be 1.91 g.). The oil crystallized upon cooling. The M.P. of the crude material (slightly orange-yellow) was (softens 33°–) 35° –37° (Kofler-block). The ultraviolet absorption in isooctane solution was determined in the range from 230 to 340 m$\mu$; $\lambda$ max=277 m$\mu$, E percent=22.

For analysis a sample was purified by chromatography. On a column of acid-washed alumina (5 ml. in volume, 17 cm. in height), packed in Skellysolve B, a 75-mg. portion was placed in isooctane solution. Washing with Skellysolve B produced only a trace of oily eluate. Further elution with 5% diethyl ether-95% (v./v.) isooctane produced 67 mg. of perfectly clear colorless oil, obtained by evaporation of the eluates, which crystallized promptly on seeding. Two recrystallizations from ether-ethanol and isooctane-ethanol produced 53 mg. of pure white spheroidal aggregate, M.P. (S—36°–38°) 38°–39° (Kofler-block).

*Analysis.*—Calcd. for $C_{61}H_{96}O_4$ C, 82.00, H, 10.83, $CH_3O$—(4), 13.9%. Found: C, 81.85; H, 10.82; $CH_3O$—, 14.17%.

EXAMPLE 2

*1,4 - Diethoxy - 2,3-Dimethoxy-5-Methyl-6-[3'-Methyl-2'-Butenyl-Enakis-(3'-Methyl-2'-Butenylene)]-Benzene*

The hydroquinone of Coenzyme Q-10, prepared as in Step A of Example 1 was then treated as in Step B except that 5 ml. of redistilled diethyl sulfate was used instead of the dimethyl sulfate. This produced the corresponding 1,4-diethoxy compound namely the compound of the title of this example.

EXAMPLE 3

*1,4 - Dibutoxy - 2,3-Dimethoxy-5-Methyl-6-[3'-Methyl-2'-Butenyl-Enakis-(3'-Methyl-2'-Butenylene)]-Benzene*

The hydroquinone of Coenzyme Q-10, prepared as in Step A of Example I was then treated as in Step B except that 5 ml. of redistilled dibutyl sulfate was used instead of the dimethyl sulfate. This produced the corresponding 1,4 butoxy compound namely the compound of the title of this example.

EXAMPLE 4

*1,4 - Dihexoxy - 2,3-Dimethoxy-5-Methyl-6-[3'-Methyl-2'-Butenyl-Enakis-(3'-Methyl-2'-Butenylene)]-Benzene*

The hydroquinone of Coenzyme Q-10, prepared as in Step A of Example I was then treated as in Step B except that 5 ml. of redistilled dihexyl sulfate was used instead of the dimethyl sulfate. This produced the corresponding 1,4 hexoxy compound namely the compound of the title of this example.

EXAMPLE 5

*1,2,3,4 - Tetramethoxy-5-Methyl-6-[Tetrakis-(3'-Methyl-2'-Butenylene)-3'-Methyl-2'-Butenyl]-Benzene*

By starting with Coenzyme Q-5 and subjecting it to the reduction of Step A of Example I, the hydroquinone of Coenzyme Q-5 is obtained. It is then treated as in Step B of Example I to obtain the desired end product namely the compound of the title of this example.

It will be apparent that by starting with Coenzymes Q-6, Q-7, Q-8, Q-9, the corresponding 1,4-dimethoxy derivative is obtained. Or, by employing the lower alkyl sulfate as set forth in Examples 2 to 5 the corresponding 1,4-diloweralkyl derivative is obtained.

EXAMPLE 6

*1,2,3,4-Tetramethoxy-5-Methyl-6-[3',7'-Dimethyl-2',6'-Octadienyl)]-Benzene*

By employing 2,3-dimethoxy-5-methyl-6-geranylhydroquinone the preparation of which is described in said Shunk et al. application, and carrying out the Step B of Example 2, there is obtained 1,2,3,4-tetramethoxy-5-methyl-6-[3',7'-dimethyl-2',6'-octadienyl)]-benzene.

EXAMPLE 7

*1,2,3,4-Tetramethoxy-5-Methyl-6-[3'-Methyl-2'-Butenyl-Bis-(3'-Methyl-2'-Butenylene)]-Benzene*

By employing 2,3-dimethoxy-5-methyl-6-farnesyl-hydroquinone, which may be produced by synthetic means, as in the co-pending application referred to above, and applying the conditions of Step B as in Example 2, there is produced 1,2,3,4-tetramethoxy-5-methyl-6-[3'-methyl-2'-butenyl-bis-(3'-methyl-2'-butenylene)]-benzene.

EXAMPLE 8

*1,2,3,4-Tetramethoxy-5-Methyl-6-[3'-Methyl-2'-Butenyl-Tetrakis-(3'-Methyl-2'-Butenylene)]-Benzene*

By employing 2,3-dimethoxy-5-methyl-6-[3'-methyl-2'-butenyl - tetrakis - (3' - methyl - 2' - butenylene)]hydroquinone, which may also be named as 2,3-dimethoxy-5-methyl - 6 - (3',7',11',15',19' - pentamethyl - 2',6',10',14',18'-eicosapentaenyl)-hydroquinone, and which may be produced synthetically as in the co-pending application referred to above, and applying the conditions of Step B as in Example 2, there is produced 1,2,3,4-tetramethoxy-5 - methyl - 6 - [3' - methyl - 2' - butenyl - tetrakis - (3'-methyl-2'-butenylene)]-benzene.

EXAMPLE 9

*1,2,3,4-Tetramethoxy-5-Methyl-6-[3'-Methyl-2-Butenyl-Heptakis(3'-Methyl-2'-Butenylene)]-Benzene*

By employing 2,3-dimethoxy-5-methyl-6-[3'-methyl-2'-butenyl-(3'-methyl-2'-butenylene)]-hydroquinone, which may also be named 2,3, dimethoxy-5-methyl-6-(3',7',11',15',19',23',27',31' - octamethyl - 2',6',10',14',18',22',26',30'-do-triacontaoctaenyl)-hydroquinone, and which may be produced synthetically as in the co-pending application referred to above, and applying the conditions of Step B as in Example 2, there is produced 1,2,3,4-tetramethoxy - 5 - methyl - 6 - [3' - methyl - 2 - butenyl-heptakis(3'-methyl-2'-butenylene)]-benzene.

What is claimed is:

1. A compound having the formula:

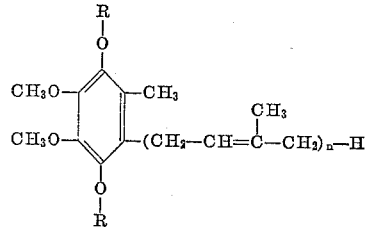

in which R is a lower alkyl radical having from 1 to 6 carbon atoms and *n* is an integer from 1 to 10.

2. A compound having the formula:

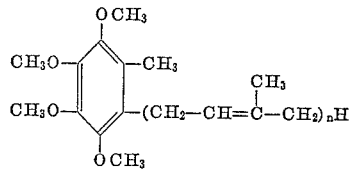

in which *n* is an integer from 1 to 10.

3. 1,2,3,4 - tetramethoxy - 5 - methyl - 6 - [3' - methyl-2'-butenyl-enakis-(3'-methyl-2'-butenylene)]benzene.

4. 1,4 - diethoxy - 2,3 - dimethoxy - 5 - methyl - 6 - [3'-methyl - 2' - butenyl - enakis - (3' - methyl - 2' - butenylene)]-benzene.

5. 1,4 - dibutoxy - 2,3 - dimethoxy - 5 - methyl - 6 - [3'-methyl - 2' - butenyl - enakis - (3' - methyl - 2' - butenylene)]-benzene.

6. 1,4 - dihexoxy - 2,3 - dimethoxy - 5 - methyl - 6 - [3'-methyl - 2' - butenyl - enakis - (3' - methyl - 2' - butenylene)]benzene.

7. 1,2,3,4 - tetramethoxy - 5 - methyl - 6 - [tetrakis-(3' - methyl - 2' - butenylene) - 3' - methyl - 2' - butenyl]-benzene.

References Cited in the file of this patent

Kumler et al.: Jour. Amer. Pharmaceutical Association (Scientific Edition) (1948), pp. 474–476. (Copy in P.O. Sci. Library.)

Vischer: Jour. Chem. Soc. (1953), pp. 815–822 (London). (Copy in Library.)